(12) United States Patent
Alastalo et al.

(10) Patent No.: US 6,872,682 B1
(45) Date of Patent: Mar. 29, 2005

(54) α-OLEFIN POLYMERIZATION CATALYST SYSTEM AND ITS USE FOR THE POLYMERIZATION OF α-OLEFINS

(75) Inventors: Kauno Alastalo, Porvoo (FI); Pauli Leskinen, Helsinki (FI)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 09/890,357

(22) PCT Filed: Feb. 11, 2000

(86) PCT No.: PCT/FI00/00098

§ 371 (c)(1),
(2), (4) Date: Jan. 9, 2002

(87) PCT Pub. No.: WO00/47638

PCT Pub. Date: Aug. 17, 2000

(30) Foreign Application Priority Data

Feb. 12, 1999 (FI) .................................................. 990283

(51) Int. Cl.⁷ .......................... B01J 31/00; B01J 37/00; C08F 4/02; C08F 4/60
(52) U.S. Cl. .......................... 502/103; 502/120; 525/53
(58) Field of Search ................................ 502/103, 120; 525/53

(56) References Cited

U.S. PATENT DOCUMENTS

| 5,455,289 A | * | 10/1995 | Caselli | 523/223 |
| 5,578,537 A | * | 11/1996 | Herrmann et al. | 502/120 |
| 5,614,455 A | * | 3/1997 | Herrmann et al. | 502/111 |
| 5,641,721 A | | 6/1997 | Pentti et al. | |
| 5,677,375 A | * | 10/1997 | Rifi et al. | 525/53 |
| 5,756,575 A | * | 5/1998 | Kawasaki et al. | 524/525 |
| 5,869,563 A | * | 2/1999 | Kawasaki et al. | 524/525 |
| 6,191,223 B1 | * | 2/2001 | Dolle et al. | 525/191 |
| 6,429,250 B1 | * | 8/2002 | Rohrmann | 524/451 |
| 6,576,710 B1 | * | 6/2003 | Huovinen et al. | 525/191 |

FOREIGN PATENT DOCUMENTS

| CN | 1183788 A | 6/1998 |
| EP | 573862 A2 | 5/1993 |
| EP | 0573862 A2 | 5/1993 |
| EP | 588277 A2 | 3/1994 |
| EP | 0588277 A2 | 3/1994 |
| EP | 0887379 A1 | 12/1998 |

* cited by examiner

Primary Examiner—Mark L. Bell
Assistant Examiner—Jennine Brown
(74) Attorney, Agent, or Firm—Birch, Stewart, Kolasch & Birch, LLP

(57) ABSTRACT

A catalyst system for the polymerization of α-olefins prepared by a process which includes catalyst activation whereby a solid transitional metal compound is contacted with an organoaluminum compound and catalyst prepolymerization whereby a premonomer is prepolymerized in the presence of the activated catalyst. High activity, low fines polymerization can be achieved if in the first step of catalyst activation a first reaction mixture is prepared by contacting the solid transitional metal compound with a first organoaluminum compound in the presence of an oil and in the second step, the first reaction mixture is contacted with a second organoaluminum compound to give a second reaction mixture, the second organoaluminum compound being the same as or different from the first organoaluminum compound.

57 Claims, No Drawings

α-OLEFIN POLYMERIZATION CATALYST SYSTEM AND ITS USE FOR THE POLYMERIZATION OF α-OLEFINS

This application is the national phase under 35 U.S.C. § 371 of PCT International Application No. PCT/FI00/00098 which has an International filing date of Feb. 11, 2000, which designated the United States of America and was published in English.

The invention relates to a catalyst or system for the polymerization of α-olefins, the catalyst being prepared by a process including a catalyst activation comprising the contacting of a solid transition metal compound with an organoaluminium compound, and a catalyst prepolymerization comprising the polymerization of a premonomer in the presence of the activated catalyst.

The word "system" means a complex unity formed of many often diverse parts subject to a common plan or serving a common purpose. Thus, a catalyst system for the polymerization of olefins means a unity formed of diverse catalyst components serving the common purpose of polymerizing olefins. The present catalyst system may or may not include further components.

The word "including" means that the process may have other steps than said activation and prepolymerization steps, as well. The word "comprising" means that the activation and prepolymerization steps may have other operations than said contacting and polymerization, as well.

The invention also relates to a process for the polymerization of an α-olefin, wherein an α-olefin is contacted with a catalyst system of the above type.

By α-olefin monomer is in this connection meant an α-olefin which is capable of polymerization by the insertion (Ziegler-Natta) mechanism. An α-olefin is a compound having the structure $CH_2=CHR$, wherein R is a linear or cyclic alkyl group. Typical α-olefin monomers of the invention are propene ($R=-CH_3$), butene-1 ($R=-CH_2CH_3$), 4-methylpentene-1 ($R=CH_2CH(CH_3)_2$), hexene-1 ($R=-(CH_2)_3CH_3$) and octene-1 ($R=CH_2)_5CH_3$). By an α-olefin polymer is meant an α-olefin homopolymer or copolymer. As monomers to be copolymerized can, in addition to α-olefin monomers of the above mentioned type, also be used ethene.

α-olefins alone or with other unsaturated monomers can often be polymerized in the presence of a so called Ziegler-Natta catalyst system, which has essentially two components: a catalyst (also called procatalyst) comprising a compound of a transition metal belonging to groups 4 to 6 of the Periodic Table of Elements (IUPAC 1990), and a cocatalyst based on an organic compound of a metal belonging to any of groups 1 to 3 and 13 of said Table. Typical compounds of transition metals are the chlorides and especially the tetrachloride of titanium.

Typical organometallic cocatalysts are organoaluminium compounds such as aluminium alkyl compounds and especially the trialkyl aluminiums. This kind of Ziegler-Natta catalyst system has been further developed by depositing and thus solidifying the transition metal compound on a more or less inert and particulate support and by adding to the catalyst composition in the stages of its preparation several additives, among others internal and external electron donors. A typical support is magnesium chloride, typical internal electron donors are the dialkyl phthalates and typical external electron donors are the alkyl alkoxy silanes. These compounds have improved the polymerization activity, the operating life and other properties of the catalyst system and above all the properties of the polymers which are obtained by means of the catalyst system. In order to further improve the properties of such a catalyst system at least a part of it has been contacted with a small amount of monomer to give a polymer coated, so called prepolymerized catalyst or catalyst system.

According to the prevailing conventional technology, the Ziegler-Natta catalyst is used in particulate form for the polymerization of olefins. Further, a precontacting thereof with a part of the cocatalyst has been used to improve the polymerization results. In order to facilitate catalyst dosing, the solid catalyst has often been combined with a wax, which enables a continuous feed thereof into the polymerization reactor. Instead of wax, a mixture thereof with oil has also been used. U.S. Pat. No. 5,641,721 discloses a process, in which a solid transition metal compound is first precontacted with a first aluminium alkyl compound, the obtained contacting product is added to a polymerization reactor containing a second aluminium alkyl compound and a wax/oil mixture, and the resulting mixture is used for the prepolymerization of propene.

However, conventional polymerization catalyst systems have the disadvantage of producing too little polymer and/or too large a fraction of polymer having a very small particle size; so called fines. By amount of fine particles is meant the percentage by weight of polymer particles of defined diameter <0.1 mm or <0.25 mm, determined by sieving of the polymerization process outcome using sieves according to ASTM 1921. The problem is pronounced when producing high isotacticity polypropene having low catalyst residue and good processability (high melt flow rate). Among other inconveniences, the fines are accumulated in the gas recycling equipment of gas phase polymerization reactors, plugging filters and causing fouling on transportation lines.

The purpose of the invention is to provide a catalyst system for the polymerization of olefins, which gives olefin polymers of low catalyst residue, good processability and high stereoregularity in combination with a low amount of fines. This purpose has now been implemented by providing a new type of catalyst system for the polymerization of olefins. The catalyst system has been prepared by a process including a catalyst activation comprising the contacting of a solid transition metal compound with an organoaluminium compound, and a catalyst prepolymerization comprising the polymerization of a premonomer in the presence of the activated catalyst. The catalyst activation step comprises a first step of contacting the solid transition metal compound with a first organoaluminium compound in the presence of an oil to give a first reaction mixture, and a second step of contacting the first reaction mixture with a second organoaluminium compound to give a second reaction mixture, the second organoaluminium compound being the same as or different from the first organoaluminium compound. It is important that at least some oil is present when the solid transition metal compound and the first organoaluminium compound are contacted for the first time. The method described in this invention allows the reduction of the amount of fine particles (diameter <0.25 mm) down to 0.5 w-% or below with no deterioration of other product or process characteristics, that is, for example the isotacticity, activity and molar mass of the product produced by this process are identical or improved compared to the traditional process.

Any order of addition may be used, as long as the oil is present when the solid transition metal catalyst compound and the first organoaluminium compound are contacted in the first step. According to a non-limiting explanation, contacting without medium or in low viscosity medium gives too vigorous a reaction which breaks the particles of the solid transition metal catalyst component. The deteriorated catalyst morphology is then reflected as an increased amount of fines in the polymer. On the other hand, using only wax, fat, paraffin or prepolymer when contacting prevents the contacting reaction almost completely and postpones it to the actual polymerization where the reaction will again be too vigorous and break the particles. By adding oil to the contacting of the first step, a smooth, suppressed reaction between the solid transition metal compound and the first organoaluminium compound is accomplished. The aim of the invention is to reach a mild activation of the solid transition metal compound by the organometal compound. The addition of oil allows the reaction which is a reduction of titanium from $Ti^{4+}$ to $Ti^{3+}$ to proceed slowly. Good morphology is thus obtained and the carrier's pores are more open since they are not filled with wax. A longer lifetime for the catalyst system and consequently a more economic process is reached.

According to one embodiment of the invention, the sequence of addition in the first step is such that both the oil and a wax, fat, solid paraffin or the like are present when contacting the solid transition metal catalyst compound and the first organoaluminium compound. If the first organoaluminium compound is called A, the solid transition metal compound is called C, the wax, fat, solid paraffin or the like is called W and the oil is called O, then this embodiment is exemplified by the following basic sequences of addition: (A+O)+(C+W), (A+W)+(C+O), [(A+O)+W)]+C, [A+(O+W)]+C, and [(A+W)+O)]+C, A+[(C+O)+W], A+[C+(O+W)], and A+[(C+W)+O]. Additionally, small amounts of each component may be freely distributed over the other components in order to optimize the effect of the addition sequence. In this embodiment, the contacting reaction is smoothened by a compatible mixture of both the oil and the wax, fat, solid paraffin or the like, and is suitable for contacting reactions which would other-wise have been exceptionally vigorous.

However, only oil and not, for example, wax, fat, solid paraffin or the like, is preferably present when contacting the solid transition metal compound and the first organoaluminium compound in the first step. If the wax, fat, solid paraffin and the like is added later in said first step this embodiment is exemplified by the following basic sequences of addition: [(A+O)+C]+W and [A+(C+O)]+W. These sequences can be modified by adding amounts of each component to any other component, providing that wax, fat, solid paraffin or the like is not present in the contacting. Thus, among others, the sequences: [(A+O)+(C+O)]+W, [(A+O)+C]+(W+O) and [A+(C+O)]+(W+O) are obtained. Further, instead of O, a mixture of a major amount of O and a minor or very small amount of W may be used, to smoothen, suppress or retard the reaction in a regulated way during the first step.

Most preferably, in the contacting of said first step, a mixture consisting essentially of the solid transition metal compound and the oil is contacted with the first organoaluminium compound. This corresponds to the above basic sequence A+(C+O).

In the contacting of the first step, the weight ratio between the solid transition metal compound and the oil is preferably between 0.1 and 5, more preferably between 0.2 and 1, most preferably between 0.3 and 0.8. Said mixture consisting essentially of the solid transition metal compound and the oil has preferably been prepared by heating them together at an elevated temperature, preferably at a temperature between about 26° C. and about 100° C., most preferably at a temperature between about 30° C. and about 80° C.

As was stated above, it is essential to prevent the contacting reaction between the solid transition metal compound and the first organoaluminium compound from becoming too vigorous and breaking the particles of the the solid transition metal catalyst component. According to the main embodiment of the invention, this is accomplished by using oil in the first step of the activation. A further means of strengthening the retarding or suppressing effect of the oil on the reaction, is the use of low temperatures. Thus, during the contacting of said first step, the solid transition metal compound, the first organoaluminium compound and the oil are preferably precontacted at a lowered temperature, more preferably at a temperature between about −20° C. and about +20° C., most preferably at a temperature between about 0° C. and about +16° C.

The intensity of the reaction between the solid transition metal catalyst component and the organoaluminium cocatalyst also depends on their ratio. Preferably, in the contacting of said first step, the first organoaluminium ($Al_1$) compound and the solid transition metal (Tr) compound are contacted in the presence of the oil in an atomic ratio $Al_1/Tr$ of between about 0.5 and about 5, preferably between about 1 and about 3. Usually, Tr is titanium Ti. Further, the contacting reaction proceeds at a certain rate, meaning that a certain reaction time is needed to obtain a desired yield of reaction product which usually is reduced titanium tetrachloride. Preferably, the solid transition metal compound, the first organoaluminium compound and the oil are precontacted for a time period enough to allow said first organoaluminium compound and said solid transition metal compound to react completely, more preferably for about 10 min to about 60 h and most preferably for about 10 h to 24 h.

According to one embodiment of the invention, this step is performed as a batch step separately from the polymerization process.

As was said before, the wax, the fat, the solid paraffin or the like may be, but preferably is not, present in the contacting the first of step. When the wax, fat, solid paraffin or the like is not present said initial contacting, it may be added to the formed first reaction mixture immediately after the initial contacting or it may later be combined with the second organoaluminium cocatalyst of the second step or added with the prepolymerization reactants. Preferably, it is added immediately after the initial contacting of the solid transition metal compound, the first organoaluminium compound and the oil. Thereby, the contacted solid transition metal compound, the organoalilminium compound and the oil are contacted directly with the wax, fat, solid paraffin or the like to give a waxed first reaction mixture.

According to one embodiment of the invention, the wax, fat, solid paraffin or the like is used alone when contacting it with the first reaction mixture. According to another embodiment, the wax, fat, solid paraffin or the like is added in the form of a mixture of said wax, fat, solid paraffin or the like and an oil. The oil of the mixture is preferably the same oil which is present during the initial contacting of the solid transition metal compound and the organoaluminium compound.

In the first step, said wax, fat, solid paraffin or the like preferably has an elevated temperature, where it is in a molten state. More preferably the elevated temperature is between about 60° C. and about 160° C., most preferably between about 80° C. and about 140° C. On the other hand, the temperature of the first reaction mixture is during contacting with the wax, fat, solid paraffin or the like below about 60° C., preferably below about 50° C., most preferably below about 40° C.

When adding the wax, fat, solid paraffin or the like alone and directly to the first reaction mixture, it is preferable, if, after the addition, the temperature is lowered to below about 30° C., more preferably below about 20° C. and most preferably below about 15° C. This lowering of the temperature thus takes place at the end of the first step before performing the step of contacting the product of the second step with the second organoaluminium compound.

In the second step of said activation, which the non-waxed first reaction mixture is contacted with a second organoaluminium compound. If the non waxed first reaction product is contacted in the second step, said wax, fat, solid paraffin or the like is optionally added at some later stage. Preferably, the first reaction mixture is contacted both with the second organoaluminium compound and an external electron donor. Further catalyst components may be also added in the second step. Usually, the contacting of the second step takes place in the prepolymerization reactor, preferably immediately before starting the actual prepolymerization reaction. The second step of activation needs a very short time, preferably only a few minutes, most preferably only 1 to 3 minutes, whereby the whole polymerization process time shortens.

As a whole, the catalyst system of the invention has preferably been prepared by a process in the first activation step of which a mixture consisting essentially of the solid transition metal catalyst compound and the oil is precontacted with the first organoaluminium compound to give a first reaction mixture. Then, the first reaction mixture is contacted with the wax, fat, solid paraffin or the like and optionally the remaining part of the oil, to give the waxed first reaction mixture. After that, the waxed first reaction mixture is in a second activation step contacted with a second organoaluminium compound to give a second reaction mixture. Finally, an olefin premonomer is prepolymerized in the presence of at least the second reaction mixture, to give said prepolymerizate.

If a mixture of oil and wax, fat, solid paraffin or the like, is used, the weight ratio between the total amount of said oil and the total amount of said wax, fat, solid paraffin or the like is such that the viscosity of their mixture at 20–25° C. is about 1 Pa.s to about 15 Pa.s, preferably about 4 Pa.s to about 10 Pa.s.

The atomic ratio between the aluminium ($Al_1$) of said first organoaluminium compound and the aluminium ($Al_2$) of said second organoaluminium compound $Al_1/Al_2$ is preferably between about 0.001 and about 1, most preferably between about 0.01 and about 0.1. Further, the atomic ratio between the aluminium (Al) of the total amount of organoaluminium compounds and the transition metal (Tr) of the solid transition metal compound depends on whether the catalyst system is used for polymerization alone or together with an additional, third organoaluminium compound. Anyhow, the total Al/Tr is preferably between about 10 and about 1000, most preferably between about 50 and about 500. The external electron donor acts during the polymerization of $C_3$- and higher α-olefins as a stereoregulating agent. The atomic to molar ratio between the aluminium (Al) of the total amount of aluminium compounds and the amount of external electron donor ED is preferably between about 1 and about 100, most preferably between about 10 and about 50.

In the invention, a solid transition metal compound is used. By definition the solid transition metal compound of the invention is a solid catalyst or catalyst component comprising a transition metal compound which is catalytically active in the polymerization of olefins and is solid and/or supported on a solid substance.

Preferably it has been prepared by contacting at least magnesium dichloride or a complex thereof, titanium tetrachloride and an internal electron donor.

In order to act as support for the titanium tetrachloride and the internal electron donor, the magnesium dichloride must be in a chemically active form. This means that the magnesium dichloride used in the claimed process must have lower crystallinity and higher specific surface area than commercial magnesium dichloride.

Magnesium dichloride may be activated mechanically e.g. by dry-comilling anhydrous magnesium dichloride with an internal electron donor. Thereafter, the comilled product is heat-treated with an excess of titanium tetrachloride, followed by repeated washings with titanium tetrachloride and/or hydrocarbons. Typically, such catalyst components exhibit a high specific surface area (50–300 $m^2/g$) and contain from 0.5 to 3% by weight of titanium.

Preferably, the magnesium dichloride is activated chemically. It can be accomplished by bringing a complex of magnesium dichloride in contact with the internal electron donor and the titanium tetrachloride, whereby the complex is converted to activated magnesium dichloride supporting the electron donor and the titanium tetrachloride.

According to a preferred embodiment of the invention, said complex of magnesium dichloride is a solid adduct of magnesium dichloride and an alcohol, which solid adduct has the formula (1)

$$MgCl_2 \cdot nROH \qquad (1)$$

wherein n is 1–6 and R is a $C_1$–$C_{10}$-alkyl. Preferably, n is 2–4 and R is a $C_1$–$C_3$-alkyl. Most preferably, the solid adduct of magnesium dichloride and an alcohol having the formula (1) is the complex $MgCl_2 \cdot 3C_2H_5OH$.

The solid adduct of magnesium dichloride and alcohol having the formula (1) is conveniently prepared by heating and melting the magnesium dichloride and the alcohol together, dispersing or spraying the melt into small droplets and solidifying the droplets by contact with a cooled medium.

The dispersion of the melt into small droplets may typically take place by pouring the melt into hot silicon oil under stirring, forming a hot dispersion of molten droplets in silicon oil. Then, the solidification is brought about by pouring the hot dispersion into cold liquid hydrocarbon.

Preferably, the melt is sprayed by means of pressurized inert gas through a die into a space containing cold inert gas, whereby the small droplets are formed and solidified very rapidly. This process is called spray crystallization.

Finally, said solid adduct in powder form is contacted with the titanium tetrachloride, part of which removes alcohol and exposes activated sites on the surface of the magnesium dichloride, and part of which coordinates to the activated sites, as well as with the internal electron donor, which also coordinates to the activated sites. The result is an active catalyst component comprising magnesium dichloride supporting coordinated electron donor and titanium tetrachloride.

As the internal electron donor to be contacted, any organic compound which contains an electron donating atom such as N, P, O and S, gives catalytic activity and enables stereospecific polymerization, can be selected. The art knows a multitude of suitable electron donors for this purpose. Preferably, the internal electron donor is a $C_1$–$C_{14}$ alkyl ester of a carboxylic acid. Typical such esters are $C_1$–$C_{14}$-alkyl esters of aliphatic dicarboxylic acids such as maleic acid, malonic acid and cyclohexanedicarboxylic acid, $C_1$–$C_{14}$-alkyl esters of aromatic monocarboxylic acids such as substituted and unsubstituted benzoic acids, and $C_1$–$C_{14}$-alkyl esters of aromatic dicarboxylic acids, preferably phthalic acid.

According to a preferred embodiment of the invention, the internal electron donor to be contacted is a $C_4$–$C_{14}$ alkyl ester of a carboxylic acid such as a $C_4$–$C_{14}$ alkyl ester of an aromatic carboxylic acid. More preferably, the internal electron donor is a di-$C_4$–$C_{14}$-alkyl ester of a dicarboxylic acid. Most preferably, the internal electron donor is a di-$C_4$–$C_{14}$-alkyl phthalate such as dioctyl phthalate DOP.

The first organoaluminium compound of the invention preferably has the formula (2):

$$R_{3m-n}Al_mX_n \quad (2)$$

wherein R is a $C_1$–$C_{12}$ alkyl X is a halogen, m is 1 or 2 and $0 \leq n \leq (3m-1)$.

Preferably, it is a trialkyl aluminium and most preferably, it is triethyl aluminium TEA. The second organoaluminium compound may be chosen freely among any organoaluminium compounds acting as cocatalysts. However, the second organoaluminium compound is preferably the same as said first organoaluminium compound.

In the invention, the first reaction mixture may be contacted with said second organoaluminium cocatalyst and an external electron donor. Electron donors which have proved to be highly stereospecific per se are chemically too unstable to be added directly to the magnesium dichloride/titanium tetrachloride reaction step. Therefore, it has been found, that it is advantageous to add an internal electron donor (see above) to occupy sites on the $MgCl_2$ and then replace it by an external electron donor.

The external donor is different from the internal donor and is preferably selected from hydrocarbyloxy silane compounds and hydrocarbyloxy alkane compounds.

Typical hydrocarbyloxy silane compounds have the formula (3)

$$R''_{n''}Si(OR''')_{4-n''} \quad (3)$$

wherein R'' is an α- or β-branched $C_3$–$C_{12}$-hydrocarbyl, R''' a $C_1$–$C_{12}$-hydrocarbyl, and n'' is an integer 1–3.

More specific examples of the hydrocarbyloxy silane compounds which are useful as external electron donors in the invention are diphenyldimethoxy silane, dicyclopentyldimethoxy silane, dicyclopentyldiethoxy silane, cyclopentylmethyldimethoxy silane, cyclopentylmethyldiethoxy silane, dicyclohexyldimethoxy silane, dicyclohexyldiethoxy silane, cyclohexylmethyldimethoxy silane, cyclohexylmethyldiethoxy silane, methylphenyldimethoxy silane, diphenyldiethoxy silane, cyclopentyltrimethoxy silane, phenyltrimethoxy silane, cyclopentyltriethoxy silane, phenyltriethoxy silane.

Most preferably, the alkoxy silane compound having the formula (3) is dicyclopentyl dimethoxy silane or cyclohexylmethyl dimethoxy silane.

The activation step described above is followed by a prepolymerization.

In the prepolymerization, a premonomer is prepolymerized in the presence of at least said second reaction mixture to give a prepolymerizate. Preferably, the atomic ratio $Al_{1+2}/Tr$ between, on one hand, the aluminium of the first organoaluminium compound and the second organoaluminium compound taken together, and, on the other hand, the transition metal (Tr), is from about 1 to about 10, most preferably from about 3 to about 8.

In the prepolymerization, the amount of said olefin premonomer is preferably such that the obtained weight ratio between the prepolymer obtained therefrom and said solid transition metal compound is between 1 and 10, most preferably between 1 and 5.

The used olefin premonomer may be any suitable olefin, but preferably it is a $C_2$–$C_6$ olefin, more preferably ethene or propene, most preferably ethene. The prepolymerization is preferably carried out at a temperature between about 5° C. and about 40° C., most preferably at a temperature between about 10° C. and about 30° C.

In the invention, the active components are treated with a wax, fat, solid paraffin or the like. Preferably, the invention uses a wax. A wax is a natural or artificial solid substance, which is kneadable or plastic at 20° C. and melts above 40° C. without decomposing, exhibiting viscous behaviour or being drawable into a thread, and which in its solid state is polishable under light pressure. Preferably the wax used in the invention is a low molecular weight and/or atactic olefin polymer, preferably a low molecular weight (less than ca 10,000 g/mol) polyethylene wax or an atactic polypropylene wax.

A fat is a spreadable, solid or semi-solid viscous biogenic product, which consists essentially of mixed glycerine esters of higher fatty acids having an even number of carbon atoms. A solid paraffin is a saturated aliphatic hydrocarbon or a mixture of such hydrocarbons having a low tendency towards forming chemical bonds and having a solidification point of between 50° C. and 62° C.

In the invention, the solid transition metal component and the organoaluminium cocatalyst are contacted in the presence of an oil. An oil is a water insoluble substance which is liquid at room temperature and has a relatively low vapor pressure, such as a mineral oil synthetic oil or a biogenic oil. In the invention a synthetic oil obtained by oligomerizing decene, fractionating the product to an average of 30 carbon atoms, and hydrogenating is preferable. Such a product is the 4 cSt PAO (polyalphaolefin) oil of Neste Oy. Other suitable oils are e.g. the mineral oil Technol 68, the oils Fina Vesta A 180B and Shell Ondina Oil 68 as well as the white oil Technol 68. The oligomer distribution thereof is 85% $C_{30}$, 13% $C_{40}$ and 2% $C_{50}$. Silicon oil is not recommended for the purpose of the invention.

In addition to the above described catalyst system for the polymerization of olefins, the invention relates to the above described process for preparing a catalyst system of said type.

Further, the invention relates to a process for the polymerization of an olefin, in which an olefin is contacted with a catalyst system of the above described type. The result is an improved polyolefin having low catalyst residue, good processability and a low fraction of fines. Preferably, said olefin is a $C_3$–$C_6$-α-olefin or a mixture thereof, more preferably propene or a mixture of propene and less than 20% by weight of ethene.

The catalyst system according to the invention may be used as such for the polymerization of said olefin. This means that essentially all of the organoaluminium compound(s) has been added during the two or more activation steps. Alternatively, only a part of the total amount of organoaluminium compound has been added during the activation, whereby a third organoaluminium compound is added in connection with the contacting of the olefin and the claimed catalyst system. The third organoaluminium compound is preferably the same as said first and/or second organoaluminium compound. In the claimed polymerization process, the atomic ratio Al/Tr, preferably Al/Ti is preferably 40–1000, most preferably about 50 to about 500.

In the polymerization process of the invention, the molar mass of the polyolefin may be regulated by using a chain transfer agent like hydrogen. Preferably, the hydrogen is contacted with said catalyst system and said olefin under polymerization conditions, preferably in an amount giving propylene polymer having a melt flow rate $MFR_2$ of between 0.03 g/10 min and 2000 g/10 min, more preferably 0.3–1000 g/10 min, most preferably between 1.0 g/10 min and 400 g/10 min.

EXAMPLES

Example 1

Highly active catalyst and highly active polymerization conditions were used to test the properties of the novel system.

Catalyst handling, preactivation

A propylene polymerization catalyst of Ziegler-Natta-type (according to Finnish Patent No. 88047) was preactivated with a low amount of triethylaluminium (TEA) in 100 dm$^3$ pilot scale reactor. In catalyst preactivation (500 g) dry catalyst was at first fed into polyalfaolefin, PAO 4 st (31 dm$^3$) (manufactured by Neste Oyj) oil at 30° C. temperature. Oil/catalyst mixture was cooled down to 10° C. and TEA having Al/Ti molar ratio of 1.5 was mixed in (The titanium content of the catalyst was 2.0 wt-%). After 1 hour mixing, temperature was increased and 18 dm$^3$ grease, White Protopet (manufactured by Witco) was added at 40° C. to keep the viscosity moderate. The mixture was cooled down to room temperature before use in polymerization. The catalyst consentration in oil-grease mixture was 10 g/dm$^3$.

Catalyst feed and prepolymerization

Said mixture of catalyst and viscous medium was fed with non valve piston pump according to Finnish patent no 94164. The catalyst was contacted with triethyl-aluminium (TEA) and dicyclopentyldimethoxysilane (DCPDMS) in pipeline. Al/Ti molar ratio was 250 mol/mol and Al/D molar ratio was 10. The contact time between catalyst, cocatalyst and donor was 15 seconds.

The catalyst was flushed with propylene (15 kg/h) to the prepolymerization reactor (CCSTR=Compartmented Continuous Stirred Tank Reactor) in which also TEA and DCPDMS were fed. The CCSTR reactor has been introduced in Finnish Patent application no 961152. The prepolymerization reactor was operated at 55 barg pressure and at the temperature of 30° C.

The mean residence time of the catalyst was 8 minutes in prepolymerization reactor.

TEA/Ti molar ratio was kept at 250 and molar ratio was kept at 10.

Polymerization conditions

Polymerization conditions in loop reactor during the test were as follows: reaction temperature 70° C., pressure 40 barg polymer residence time 1.5 hours. The MFR measured according to ISO 1133 (2.16 kg, 230° C.) of the produced PP-homo-polymer was controlled to be 9–12 via hydrogen feed. The test was duplicated in example 1b. Product characteristics are shown in Table 1.

The xylene soluble fraction (XS) fraction was measured and calculated as follows:
2.0 g of polymer are dissolved in 250 ml p-xylene at 135° C. under agitation. After 30±2 minutes the solution is allowed to cool for 15 minutes at ambient temperature and then allowed to settle for 30 minutes at 25±0.5° C. The solution is filtered with filter paper into two 100 ml flasks. The solution from the first 100 ml vessel is evaporated in nitrogen flow and the residue is dried under vacuum at 90° C. until constant weight is reached.

$$XS\ \% = (100 \times m_1 \times v_0)/(m_0 \times v_1)$$

$m_0$ = initial polymer amount (g)
$m_1$ = weight of residue (g)
$v_0$ = initial volume (ml)
$v_1$ = volume of analyzed sample (ml)
PS in the average particle size according to ASTM 1921
The tensile modulus was determined according to ISO 527 (1 mm/1 min). The activity has been calculated from the added amount of catalyst and the amount of product recovered per hour (kg PP/h/g catalyst/h).

Example 2

The procedure was the same as in example 1 but cocatalyst and donor split according to Finnish patent application no FI 952175 was used in this test 10 wt-% of the total amount of TEA and 10 wt-% of total amount of DCPDMS were fed to catalyst activation and the rest of the TEA and DCPDMS were fed directly to the polymerization.

The test was duplicated in example 2b. Product characteristics are shown in Table

Comparative Example 3

The procedure was the same but preactivation was not carried out for this reference test Highly active catalyst (according to Finnish Patent no 88047) and polymerization system were used to test the properties of conventional system Catalyst handling A propylene polymerization catalyst of Ziegler-Natta-type was mixed with an oil-grease mixture. A mixture of synthetic oil (polyalfaolefin, PAO 4 st) and grease (White Protopet) was made separately having weight ratio of 1.75/1 and total amount of 50 dm$^3$. The dry catalyst (500 g) was fed slowly into the reactor and the mixture was mixed half an hour at the temperature of 70° C. and the reactor was cooled down to room temperature. The catalyst consentration in oil-grease mixture was 10 g/dm$^3$.

Catalyst feed and prepolymerization, polymerization

The catalyst was fed, prepolymerized and polymerized as in example 1. The test was duplicated in example 3b. Product characteristics are shown in Table 1.

TABLE 1

| Example | Catalyst preact | Al, Don split | Fines <0.25 mm | Av. PS mm | XS wt-% | BD g/cm$^3$ | Act. kg/g cat. | MFR$_2$ g/10 min. | Tens. Mod. MPa |
|---|---|---|---|---|---|---|---|---|---|
| 1a | yes | no | 9.3 | 1.24 | 1.8 | 0.4 | 44.3 | 12 | nm |
| 1b | yes | no | 10.7 | 1.192 | 1.9 | 0.39 | 44.3 | 11 | 1720 |
| 2a | yes | yes | 12.0 | 1.192 | 1.90 | 0.42 | 48.6 | 13 | nm |
| 2b | yes | yes | 10.6 | 1.212 | 1.90 | 0.42 | 47.1 | 12 | 1720 |
| 3a | no | no | 25.4 | 0.791 | 1.80 | 0.40 | 33.5 | 9 | nm |
| 3b | no | no | 22.7 | 0.772 | 1.60 | 0.40 | 33.8 | 9 | 1710 | nm = not measured

What is claimed is:

1. A catalyst system for the polymerization of α-olefins, the catalyst being prepared by a process including a catalyst activation comprising the contacting of a solid transition metal compound with an organoaluminum compound, and a catalyst prepolymerization comprising the polymerization of a premonomer in the presence of the activated catalyst, the catalyst activation comprising a first step of contacting the solid transition metal compound with a first organoaluminum compound in the presence of an oil to give a first reaction mixture wherein the weight ratio between said solid transition metal compound and said oil is between 0.1 and 5, and a second step of contacting the first reaction mixture with a second organoaluminum compound to give a second reaction mixture, the second organoaluminium compound being the same as or different from the first organoaluminum compound.

2. The —catalyst system according to claim 1, wherein in said first step, a mixture consisting essentially of said solid transition metal catalyst component and said oil is preactivated with said first organoaluminum compound.

3. The catalyst system according to claim 2, wherein in said first step, said mixture consisting essentially of said solid transition metal compound and said oil has been prepared by heating them together at a temperature between about 26° C. and about 100° C.

4. The catalyst system according to claim 1, wherein in said first step, said solid transition metal compound, said organoaluminum compound and said oil are precontacted at a temperature between −20° C. and about +20° C.

5. The catalyst system according to claim 1, wherein in said first step, said organoaluninum compound ($Al_1$) and said solid transition metal (Tr) compound are contacted in the presence of said at least a part of the oil in an atomic ration $Al_1/Tr$ of between 0.5 and about 5.

6. The catalyst system according to claim 1, wherein in said first step, said first reaction mixture is further contacted with a wax, fat or solid paraffin to give a waxed first reaction mixture.

7. The catalyst system according to claim 6, wherein in said first step, said wax, fat or solid paraffin is added at higher temperature than its melting point.

8. The catalyst system according to claim 1, wherein said first reaction mixture or said waxed first reaction mixture is further activated with said second organoaluminum compound in the second step.

9. The catalyst system according to claim 8, wherein in said second step, said first reaction mixture or said waxed first reaction mixture is contacted with an external electron donor.

10. The catalyst system according to any of claims 6 to 9, wherein the weight ratio between the total amount of said oil and the total amount of said wax, fat or solid paraffin is such that the viscosity of their mixture at 20–25° C. is about 1 Pas to about 15 Pa.s.

11. The catalyst system according to claim 1, wherein the atomic ratio between the aluminum ($Al_1$) of said first orgonoaluminum compound $Al_1/Al_2$ is between about 0.0001 and about 1.

12. The catalyst system according to claim 1, wherein the atomic ratio between the aluminum (Al) of the total amount of or organoaluminum compound and the transition metal (Tr) of the solid transition metal compound Al/Tr is between about 10 and 1000.

13. The catalyst system according to claim 1, wherein said solid transition metal compound has been prepared by contacting at least magnesium dichloride or a complex thereof, titanium tetrachloride and an internal electron donor.

14. The catalyst system according to claim 1, wherein said first organoaluminum compound has the formula (I):

Wherein R is a $C_1$–$C_{12}$ alkyl, X is a halogen, m is 1 or 2 and $0 \leq n \leq (3m-1)$.

15. The catalyst system according to claim 1, wherein said second organoaluminum compound is the same as said first organoaluminum compound.

16. The catalyst system according to claim 1, wherein in the prepolymerization, the premonomer is polymerized in the presence of at least said second reaction mixture to give a prepolymerizate.

17. The catalyst system according to claim 1, wherein in the the atomic ratio of the total amount of aluminum to transition metal $[(Al_1+Al_2)/Tr]$ is from about 1 to about 10 where the total amount of aluminum is the sum of said second organoaluminum compound ($Al_2$) and said first organoaluminum compound ($Al_1$).

18. The catalyst system according to claim 1, wherein in prepolymerization, the amount of said olefin premonomer is such that the obtained weight ratio between the prepolymer obtained thereform and said solid transition metal catalyst compound is between 1 and 10.

19. The catalyst system according to claim 1, wherein in the prepolymerization, said olefin premonomer is ethene.

20. A process for the polymerization of an olefin, wherein an α-olefin is contacted with a catalyst system prepared by a process including a catalyst activation step comprising the contacting of a solid transition metal compound with an organoaluminum compound, and a catalyst prepolymerization step comprising the polymerization of a premonomer in the presence of the activated catalyst, the catalyst activation comprising a first step of contacting the solid transition metal compound with a first organoaluminum compound in the presence of an oil to give a first reaction mixture wherein the weight ratio between said solid transition metal compound and said oil is between 0.1 and 5, and a second step of contacting the first reaction mixture with a second organoaluminum compound to give a second reaction mixture, the second organoaluminum compound being the same as or different from the first organoaluminum compound.

21. The process according to claim 20, wherein said α-olefin is a $C_3$–$C_6$-α-olefin or a mixture thereof.

22. The process according to claim 20 or 21, wherein said α-olefin is copolymerized with another α-olefin monomer or ethene.

23. The process according to claim 20 or 21, wherein the olefin is contacted with a third organoaluminum compound.

24. The process according to claim 23, wherein the third organoaluminum compound is the same as said first and/or second organoaluminum compound.

25. The process according to claim 23, wherein the total amount of aluminum Al is such that the atomic ratio Al/Tr is 40–1000.

26. The process according to claim 20, wherein hydrogen is contacted with said catalyst system and said olefin under polymerization conditions, preferably in an amount giving propylene polymer having a melt flow rate $MFR_2$ of between 0.3 g/10 min and 2000 g/10 min.

27. The catalyst system according to claim 12, wherein the weight ratio between the solid transition metal compound and the oil is between 0.2 and 1.

28. The catalyst system according to claim 27, wherein the weight ratio is between 0.3 and 0.8.

29. The catalyst system according to claim 3, wherein the mixture has been prepared at a temperature of between about 30° C. and about 80° C.

30. The catalyst system according to claim 4, wherein the precontacting step is carried out at a temperature of between 0° C. and about +16° C.

31. The catalyst system according to claim 5, wherein the atomic ratio of $Al_1/Tr$ is between about 1 and about 3.

32. The catalyst system according to claim 10, wherein the viscosity of the mixture is about 4 Pa.s to about 10 Pa.s.

33. The catalyst system according to claim 11, wherein the atomic ratio between the aluminum $(Al_1)$ of said first organoaluminum compound $Al_1/Al_2$ is between about 0.01 and about 0.1.

34. The catalyst system according to claim 12, wherein the atomic ratio between the aluminum (Al) of the total amount of the organoaluminum compound and the transition metal (Tr) of the solid transition metal compound Al/Tr is between about 50 and 500.

35. The catalyst system according to claim 14, wherein the first organoaluminum compound according to formula (I) is a trialkyl aluminum.

36. The catalyst system according to claim 14, wherein the first organoaluminum compound according to formula (I) is triethyl aluminum TEA.

37. The catalyst system according to claim 17, wherein the atomic ratio $Al_{1+2}/Tr$ is from about 3 to about 8.

38. The catalyst system according to claim 18, wherein the obtained weight ratio between the prepolymer obtained and the solid transition metal catalyst compound is between 1 and 5.

39. The process according to claim 21, wherein the α-olefin is propene or a mixture of propene and less than 20% by weight of ethane.

40. The process according to claim 25, wherein the atomic ratio Al/Tr is about 50 to 500.

41. The process according to claim 26, wherein the melt flow rate $MFR_2$ is 0.3–1000 g/10 min.

42. The process according to claim 26, wherein the melt flow rate $MFR_2$ is between 1.0 g/10 min and 400 g/10min.

43. A process for the preparation of a catalyst system for the polymerization of α-olefins, the catalyst being prepared by a process including a catalyst activation comprising the contacting of a solid transition metal compound with an organoaluminum compound, and a catalyst prepolymerization comprising the polymerization of a prenomomer in the presence of the activated catalyst, the catalyst activation comprising a first step of contacting the solid transition metal compound with a first organoaluminum compound in the presence of an oil to give a first reaction mixture wherein the weight ratio between said solid transition metal compound and said oil is between 0.1 and 5, and a second step of contacting the first reaction mixture with a second organoaluminum compound to give a second reaction mixture, the second organoaluminum compound being the same as or different from the first organoaluminum compound.

44. The process according to claim 42, wherein in said first step, a mixture consisting essentially of said solid transition metal catalyst component and said oil is preactivated with said first organoaluminum compound.

45. The process according to claim 43, wherein in said first step, said organoaluminum compound $(Al_1)$ and said solid transition metal (Tr) compound are contacted in the presence of said at least a part of the oil in an atomic ration $Al_1/Tr$ of between 0.5 and about 5.

46. The process according to claim 43, wherein in said first step, said first reaction mixture is further contacted with a wax, fat or solid paraffin to give a waxed first reaction mixture.

47. The process according to claim 43, wherein said first reaction mixture or said waxed first reaction mixture is further activated with said second organoaluminum compound in the second step.

48. The process according to claim 47 wherein in said second step, said first reaction mixture or said waxed first reaction mixture is contacted with an external electron donor.

49. The process according to any of claims 46 to 48, where the weight ratio between the total amount of said oil and the total amount of said wax, fat or solid paraffin is such that the viscosity of their mixture at 20–25° C. is about 1 Pa.s to about 15 Pa.s.

50. The process according to claim 43, wherein the atomic ratio between the aluminum $(Al_1)$ of said first organoaluminum compound $Al_1/Al_2$ is between about 0.0001 and about 1.

51. The process according to claim 43, wherein the atomic ratio between the aluminum (Al) of the total amount of or organoaluminum compound and the transition metal (Tr) of the solid transition metal compound Al/Tr is between about 10 and 1000.

52. The process according to claim 43, wherein said first organoaluminum compound has the formula (I):

$$R_{3m-n}Al_mX^n$$

Wherein R is a $C_1$–$C_{12}$ alkyl, X is a halogen, m is 1 or 2 and $0 \leq n \leq (3m-1)$.

53. The process according to claim 43, wherein said second organoaluminum compound is the same as said first organoaluminum compound.

54. The process according to claim 43, wherein in the prepolymerization, the premonomer is polymerized in the presence of at least said second reaction mixture to give a prepolymerizate.

55. The process according to claim 43, wherein the prepolymerization, the atomic ratio of the total amount of aluminum to transition metal $[(Al_1+Al_2)/Tr]$ is from about 1 to about 10 where the total amount of aluminum is the sum of said second organoaluminum compound $(Al_2)$ and said first organoaluminum compound $(Al_1)$.

56. The process according to claim 43, wherein in prepolymerization, the amount of said olefin premonomer is such that the obtained weight radio between the prepolymer obtained thereform and said solid transition metal catalyst compound is between 1 and 10.

57. The process according to claim 43, wherein in the prepolymerization, said olefin premonomer is ethene.

* * * * *